(12) United States Patent
Mowry

(10) Patent No.: US 8,892,689 B1
(45) Date of Patent: Nov. 18, 2014

(54) METHOD AND APPARATUS FOR A STORAGE SERVER TO AUTOMATICALLY DISCOVER AND JOIN A NETWORK STORAGE CLUSTER

(75) Inventor: Robert P. Mowry, Cranberry Township, PA (US)

(73) Assignee: NetApp, Inc., Sunnyvale, CA (US)

( * ) Notice: Subject to any disclaimer, the term of this patent is extended or adjusted under 35 U.S.C. 154(b) by 1437 days.

(21) Appl. No.: 12/112,841

(22) Filed: Apr. 30, 2008

(51) Int. Cl.
*G06F 15/16* (2006.01)

(52) U.S. Cl.
USPC .......................................... 709/219

(58) Field of Classification Search
USPC ........................... 709/220, 227, 228
See application file for complete search history.

(56) References Cited

U.S. PATENT DOCUMENTS

| 5,564,060 | A  | * | 10/1996 | Mahalingaiah et al. | 710/51  |
|-----------|----|---|---------|---------------------|---------|
| 6,449,641 | B1 | * | 9/2002  | Moiin et al.        | 709/220 |
| 6,516,345 | B1 | * | 2/2003  | Kracht              | 709/220 |
| 6,691,165 | B1 | * | 2/2004  | Bruck et al.        | 709/227 |
| 6,917,626 | B1 | * | 7/2005  | Duvvury             | 370/466 |
| 7,028,071 | B1 | * | 4/2006  | Slik                | 709/201 |
| 7,370,223 | B2 | * | 5/2008  | Olmstead et al.     | 714/4.11|
| 7,545,820 | B2 | * | 6/2009  | Duvvury             | 370/401 |
| 7,617,289 | B2 | * | 11/2009 | Srinivasan et al.   | 709/209 |
| 7,650,397 | B2 | * | 1/2010  | Price et al.        | 709/221 |
| 7,925,749 | B1 | * | 4/2011  | Lin et al.          | 709/225 |
| 8,032,580 | B2 | * | 10/2011 | Slik                | 709/201 |
| 2005/0021690 | A1 | * | 1/2005 | Peddada            | 709/220 |
| 2005/0207414 | A1 | * | 9/2005 | Duvvury            | 370/389 |
| 2006/0047790 | A1 | * | 3/2006 | Nguyen             | 709/220 |

* cited by examiner

*Primary Examiner* — Sargon Nano
(74) *Attorney, Agent, or Firm* — Perkins Coie LLP

(57) ABSTRACT

A method and system for automatic configuration and installation of network storage server to a network storage cluster is described. When the first storage server is installed, the automatic configuration process extracts from the user information necessary for configuration of the cluster. Upon entering all the configuration information, the storage server is rebooted and the new cluster is created. For a network storage server attempting to join an existing cluster, broadcast packets are sent by the joining storage server on its cluster port requesting a response from all available clusters. If a single response is received the joining storage server initiates the configuration process and joins the cluster. If multiple responses are received the joining storage server let the operator choose the cluster to join. If no responses are received the joining storage server retries the broadcast request repeatedly until a response is received.

11 Claims, 8 Drawing Sheets

| + | Bits 0-15 | Bits 16-31 |
|---|---|---|
| 0 | Source Port<br>71 | Destination Port<br>72 |
| 32 | Length<br>73 | Checksum<br>74 |
| 64 | Data 75 ||

Fig. 7

METHOD AND APPARATUS FOR A STORAGE SERVER TO AUTOMATICALLY DISCOVER AND JOIN A NETWORK STORAGE CLUSTER

FIELD OF THE INVENTION

At least one embodiment of the present invention pertains to network storage systems, and more particularly, to automated configuration of a network storage server for installation to a network storage cluster.

BACKGROUND

A storage server is a computer system that is used to store and retrieve data on behalf of one or more clients on a network. A storage server operates on behalf of one or more clients to store and manage data in a set of mass storage devices, such as magnetic or optical storage-based disks or tapes. In conventional network storage systems, the mass storage devices may be organized into one or more groups of drives (e.g., redundant array of inexpensive drives (RAID)).

A storage server may be configured to service file-level requests from clients, as in the case of file servers used in a network attached storage (NAS) environment. Alternatively, a storage server may be configured to service block-level requests from clients, as done by storage servers used in a storage area network (SAN) environment. Further, some storage servers are capable of servicing both file-level and block-level requests, as done by certain storage servers made by NetApp, Inc. of Sunnyvale, Calif.

Storage servers may be operated in a cluster. A cluster is a group of loosely coupled computers that work together closely so that in many respects they can be viewed as though they are a single computer. The components of a cluster are commonly, but not always, connected to each other through fast local area networks. Clusters are usually deployed to improve performance and/or availability over that provided by a single computer, while typically being much more cost-effective than single computers of comparable speed or availability.

High-availability (HA) clusters (also known as failover clusters) are implemented primarily for the purpose of improving the availability of services which the cluster provides. They operate by having redundant nodes, which are then used to provide service when a storage server fails. HA cluster implementations attempt to manage the redundancy inherent in a cluster to eliminate single points of failure. Load-balancing clusters operate by having all workload come through one or more load-balancing front ends, which then distribute the workload to a collection of back end systems.

When a network storage server needs to be added to a network storage cluster, the configuration process with current technology is very complex and requires that a large amount of detailed information be entered by an administrator on each network storage server. For example, in certain systems, the storage server name, location, port, IP address for management interface, IP address for the first nameserver, IP address for the second nameserver, Netmask, DNS domain name, DNS resolver, remote management, protocol, etc. need to be specified or confirmed and these user inputs need to be repeated for each storage server being added to a cluster. It is desirable to implement a simpler and more time-efficient installation process for a network storage server to be added to a network storage cluster, to reduce the time and effort required for the installation as well errors occurring from the complexity.

BRIEF DESCRIPTION OF THE DRAWINGS

One or more embodiments of the present invention are illustrated by way of example and not limitation in the figures of the accompanying drawings, in which like references indicate similar elements and in which:

FIG. 7 illustrates an example of a UDP packet; and

DETAILED DESCRIPTION

A method and system for automatic configuration and installation of a network storage server to a network storage cluster is described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The technique introduced here provides an automated mechanism to allow a storage server to join an existing storage cluster with little human intervention other than the initial input of configuration information when creating a new cluster, the application of power, and the correct connection of communication links. The technique introduced here allows relatively "hands-off" configuration of newly installed network storage servers by communicating with existing clusters via a cluster port on a storage server. The new storage server in a cluster receives all of the information required to join an existing cluster via this communication method.

In a fully automated installation process according to the technique introduced here, a storage server can be joined to a storage cluster just by turning it on and connecting the storage server to a network medium and powering it on. In another scenario, minimal input of information for the configuration of a storage server to join a cluster is performed. In one embodiment of the technique introduced here, a storage server being installed broadcasts a discovery request to a network storage cluster in a network storage system once network interface is configured. After receiving responses from multiple existing network clusters, the storage server can choose and join a cluster.

Figure 1:
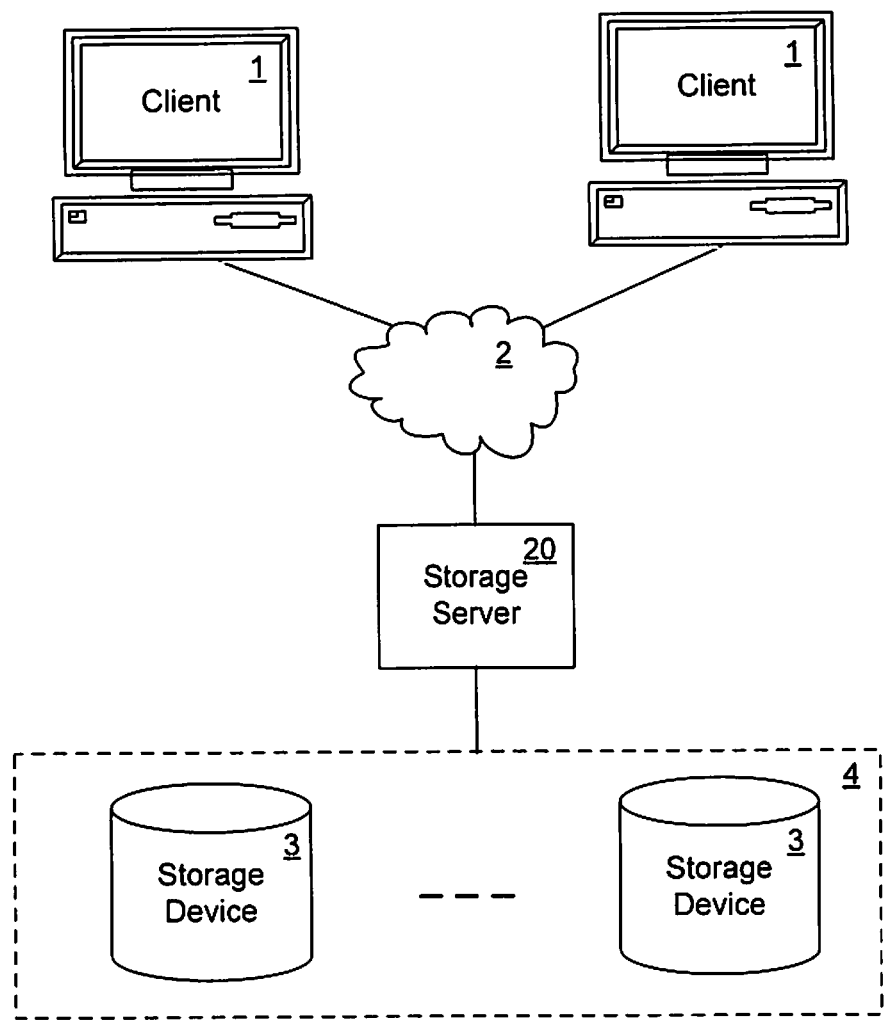
FIG. 1 illustrates a network storage system in which the present invention can be implemented.

Refer now to FIG. 1, which shows a network storage system in which the present invention can be implemented. In FIG. 1, a storage server 20 is coupled to a primary persistent storage (PPS) subsystem 4 that includes multiple mass storage devices 3, and to a set of clients 1 through an interconnect 2. The interconnect 2 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the PPS subsystem 4 is managed by the storage server 20. The storage server 20 receives and responds to various read and write requests from the clients 1, directed to data stored in or to be stored in the storage subsystem 4. The mass storage devices 3 in the PPS subsystem 4 can be, for example, conventional magnetic or optical disks or tape drives; alternatively, they can be non-volatile solid-state memory, such as flash memory. The mass storage devices in storage subsystem 4 can be organized as a Redundant Array of Inexpensive Disks/Devices (RAID), in which case the storage server 20 accesses the storage subsystem 4 using one or more well-known RAID protocols.

The storage server 20 may be a file-level server such as used in a NAS environment, a block-level storage server such as used in a SAN environment, or a storage server which is capable of providing both file-level and block-level service. Further, although the storage server 20 is illustrated as a single unit in FIG. 1, it can have a distributed architecture. For example, the storage server 20 can include a physically separate network module ("N-module") and disk module ("D-module") (not shown), which communicate with each other over an external interconnect.

Figure 2:
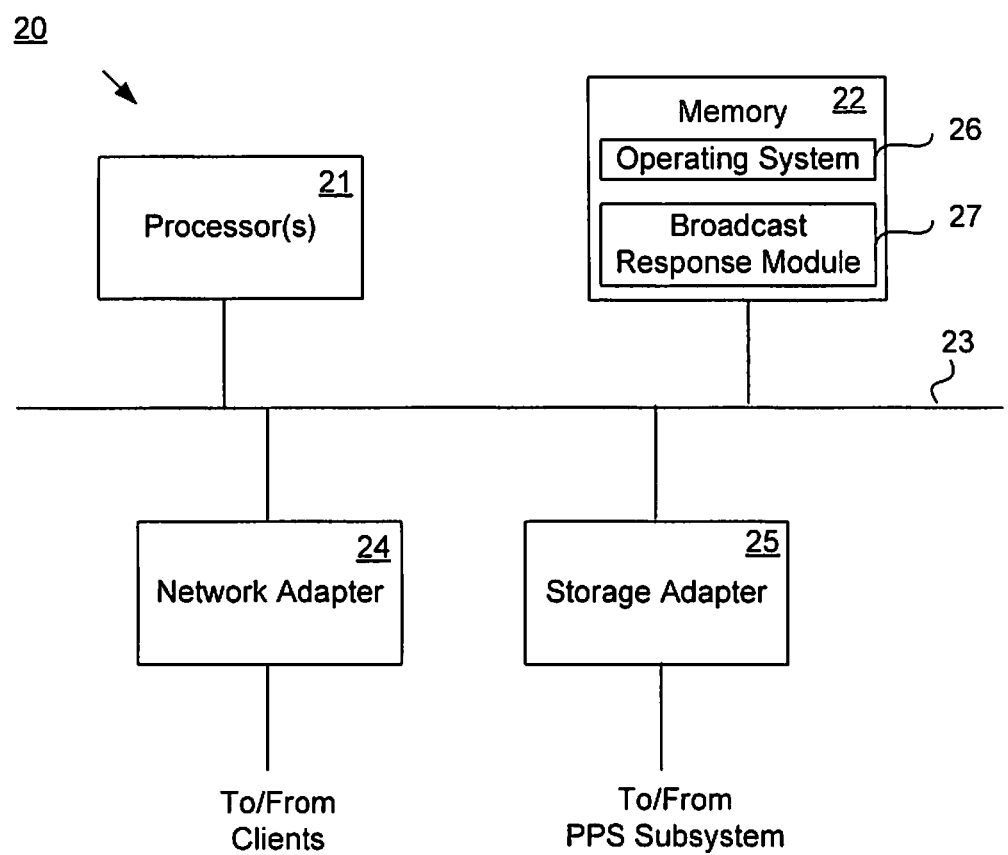
FIG. 2 is a high-level block diagram showing an example of the architecture of a storage server.

FIG. 2 is a high-level block diagram showing an example of the architecture of a storage server 20. The storage server 20 includes one or more processors 21 and memory 22 coupled to a interconnect 23. The interconnect 23 shown in FIG. 2 is an abstraction that represents any one or more separate physical buses, point-to-point connections, or both connected by appropriate bridges, adapters, or controllers. The interconnect 23, therefore, may include, for example, a system bus, a form of Peripheral Component Interconnect (PCI) bus, HyperTransport or industry standard architecture (ISA) bus, small computer system interface (SCSI) bus, universal serial bus (USB), IIC (I2C) bus, or Institute of Electrical and Electronics Engineers (IEEE) standard 1394 bus, sometimes referred to as "Firewire".

The processor(s) 21 may include central processing units (CPUs) of the storage server 20 and, thus, control the overall operation of the storage server 20. In certain embodiments, the processor(s) 21 accomplish this by executing software or firmware stored in memory 22. The processor(s) 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 22 is or includes the main memory of the storage server 20. The memory 22 represents any form of random access memory (RAM), read-only memory (ROM), flash memory (as discussed above), or the like, or a combination of such devices. In use, the memory 22 can contain, among other things, at least a portion of the storage operating system 26 of the storage server 20. Also, the memory 22 can contain a broadcast response module 27 that can respond to a discovery request from storage servers interested in joining a cluster according to the technique described here.

Also connected to the processor(s) 21 through the interconnect 23 are a network adapter 24 and a storage adapter 25. The network adapter 24 provides the storage server 20 with the ability to communicate with remote devices, such as clients 1, over the interconnect 2 and may be, for example, an Ethernet adapter or Fibre Channel adapter. The storage adapter 25 allows the storage server 20 to access the PPS subsystem 4 and may be, for example, a Fibre Channel adapter or a SCSI adapter.

Figure 3:
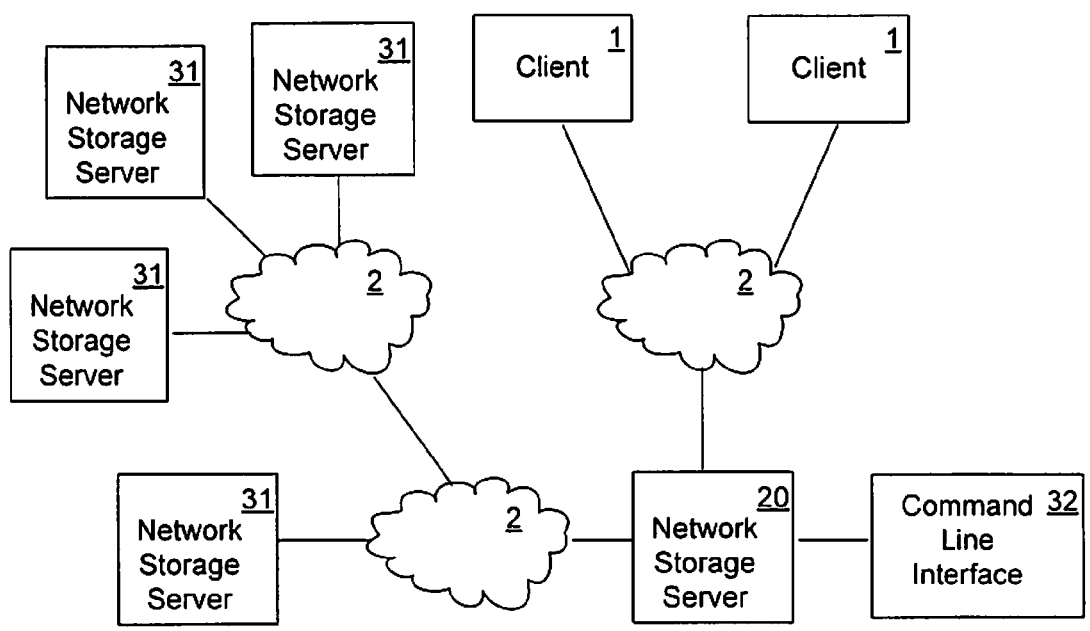
FIG. 3 illustrates an example of a clustered network storage environment.

FIG. 3 illustrates an example of a network storage system implemented in a clustered environment. Network storage servers 31 are connected in one or more clusters through one or more interconnects 2. As mentioned above, each interconnect 2 may be, for example, a local area network (LAN), wide area network (WAN), metropolitan area network (MAN), global area network such as the Internet, a Fibre Channel fabric, InfiniBand fabric, or any combination of such interconnects. The command line interface (CLI) 32 can be used by a user to communicate with a storage server 20 for management or other purposes. While the storage server 20 can include manual installation process of the storage server 20, it can also include automated installation process (e.g. automatic configuration software, which is not shown here) according to the technique introduced here. The CLI 32 is a combination of one or more input devices (e.g. a keyboard and/or mouse) and one or more output devices by which an operator can monitor and interact with a storage server 20.

In one embodiment, when the first storage server of a new cluster is installed on the network, there is a menu selection in the configuration program of the storage server that gives the user, e.g. a network administrator an option to choose an automatic configuration ("auto configuration") process. Then the user is prompted to input information, e.g. a set of IP address ranges, port names, netmasks, etc. needed for the configuration of the storage servers in the cluster including the first storage server. The information can include a range of network addresses for a management interface of a storage server to be configured and installed to a network storage cluster, a range of network addresses to be used for a network storage cluster interface, a valid network storage cluster license key, etc. Also, the auto configuration process can run a Domain Name System (DNS) resolver to specify name servers that are used to route traffic from the network storage cluster and a client network, and can verify configuration information entered by the user. Upon entering all of the configuration information from the user, the storage server is rebooted and the new cluster is created.

Storage servers 31 in the cluster are capable of responding to a new storage server 20 attempting to join the cluster. For example, broadcast User Datagram Protocol (UDP) packets are sent by the joining storage server 20 on their cluster ports requesting a response from all available clusters. All storage servers capable of responding send a UDP response to the joining storage server 20. If responses from a single cluster are received, the joining storage server 20 automatically initiates the configuration process and joins the cluster. The process of joining the cluster is described in greater details in reference to FIG. 6. If responses from multiple clusters are received, the joining storage server 20 can display a message on its display device (e.g., a small Liquid Crystal Display (LCD)) sends a list of available clusters to the CLI 32 and waits for the user (e.g. administrator) to manually choose the cluster to join. If no responses are received, the joining storage server 20 retries the broadcast UDP request repeatedly until a response is received.

Figure 4:
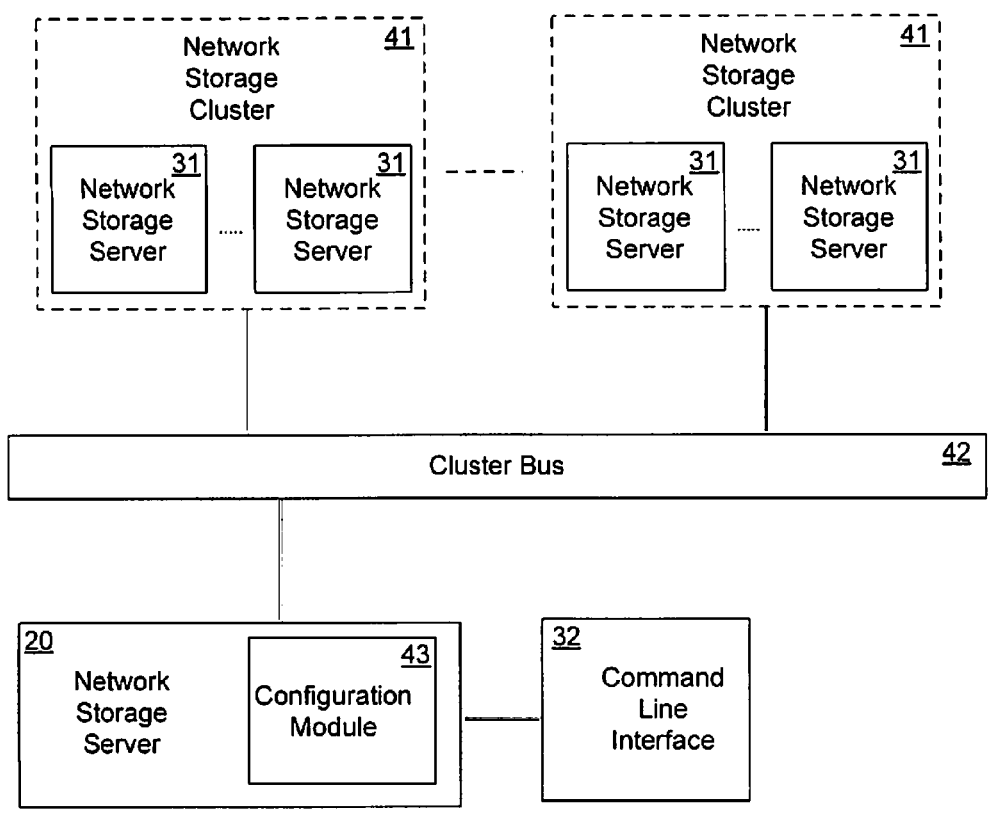
FIG. 4 is a high-level block diagram showing an example of a network storage server communicating with network storage clusters through a cluster bus.

FIG. 4 is a high-level block diagram showing an example of how a network storage server can communicate with other storage servers in a clustered environment through a cluster bus. Network storage clusters 41 are connected through a cluster bus 42. Cluster bus 42 can be any of the types of interconnect 2 described above, such as a local area network (LAN), wide area network (WAN), metropolitan area network (MAN), global area network such as the Internet, a Fibre Channel fabric, or any combination of such interconnects. A network storage server 20 trying to join a cluster communicates with existing network storage clusters 41 through the cluster bus 42. The cluster bus 42 forms a backplane capable of conveying all of the broadcast traffic between the storage servers. The network storage server 20 includes a configuration module 43 (i.e., a management application for configuration) that manages the automatic configuration process described here.

The existing cluster storage servers 31 process a request to join a cluster by dynamically assigning to the joining storage server 20 attributes (e.g. owner, location, asset tag, etc.) required for a storage server to join a cluster 41, which are then persistently stored on the storage server's root volume. This information is persisted across the cluster 41 and can be queried multiple times by the joining storage server 20 in the case of a failure during configuration. Certain data (e.g. storage server names) are automatically generated by the auto configuration process which is executed in the configuration module 43 by combining user input (e.g. the cluster name) with unique numeric values. Upon successful completion of the process, the new storage server 20 has joined one of the existing clusters 41.

Figure 5:
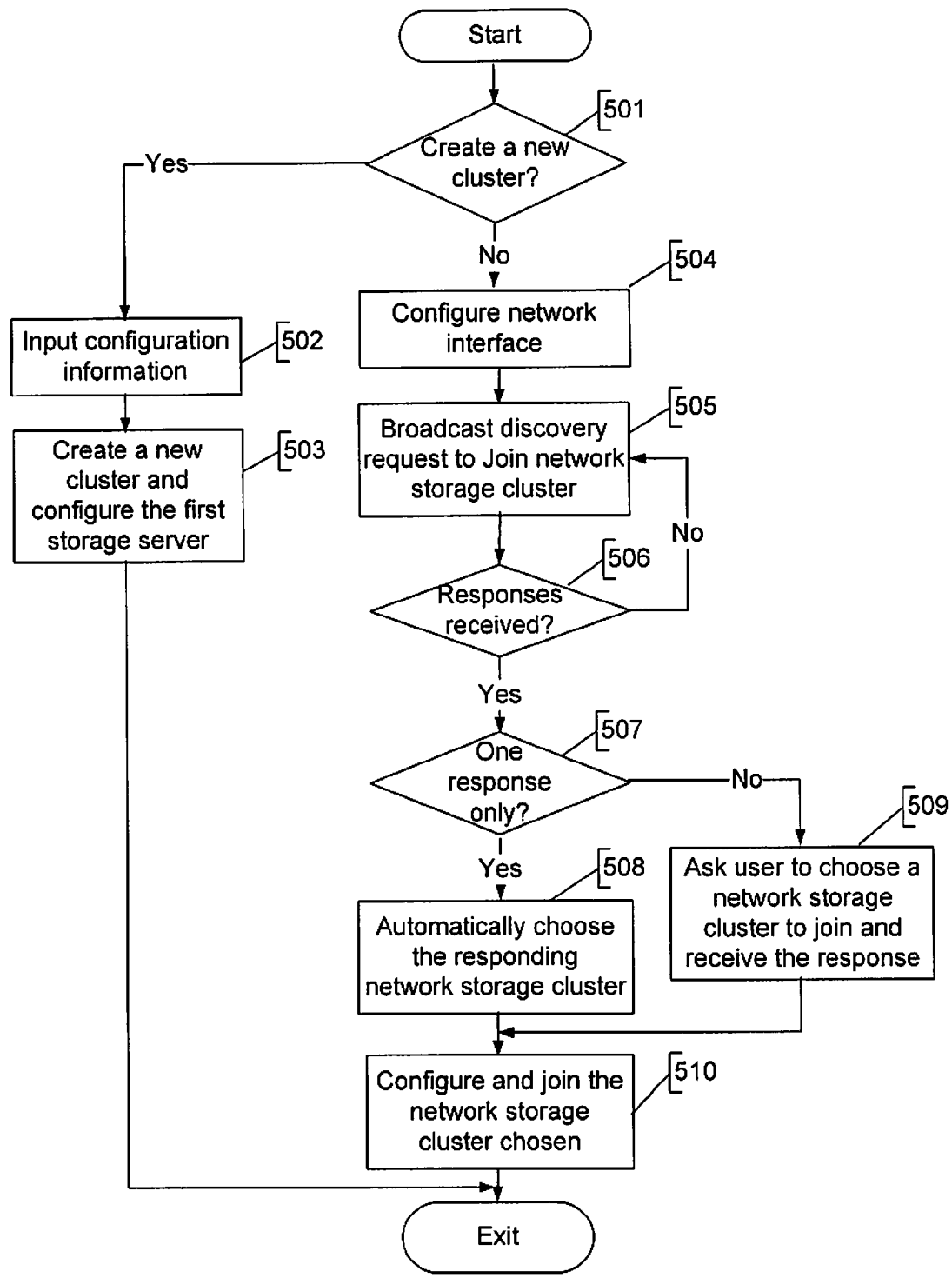
FIG. 5 is a flow diagram showing a process in a storage server for joining a cluster.

FIG. 5 is a flow diagram showing that a process can be executed in a storage server to configure and join a cluster using the auto configuration technique introduced here. The auto configuration process (run in the configuration module 43) is typically enabled by a user on the console of the storage server that creates the cluster. This initial configuration sequence is run once at the very beginning of the cluster creation process and gathers the input needed to fulfill subsequent cluster join requests that arrive via UDP broadcast packets. The auto configuration process first decides whether the storage server will be the first member of a cluster, i.e. whether it needs to create a new cluster, from user input and configure the first storage server in the cluster at 501. The process of inputting this data can be initiated by the administrator on the console by manually interrupting the start sequence via the keyboard.

Figure 6:
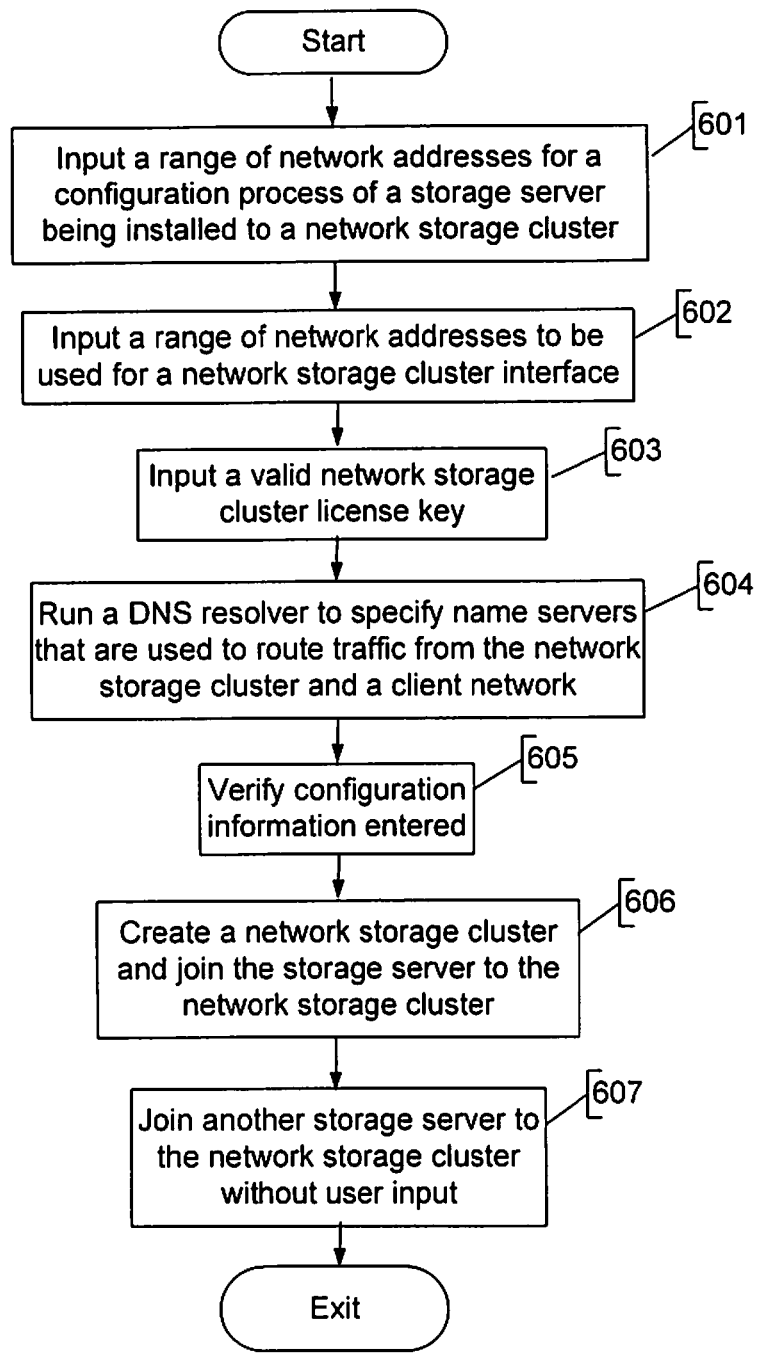
FIG. 6 is a flow diagram showing a process in storage server to join a new cluster being created.

At 502, if a new cluster needs to be created, the auto configuration process prompts the user via the CLI 32 to enter information (e.g. a cluster name, a port for the configuration module to use for the storage server, IP addresses, netmask, cluster license key, etc.) sufficient to configure the first storage server and all subsequent storage servers that will form the cluster as shown in FIG. 6. Even though these user inputs can be used for creating a new cluster, subsequent storage servers can join the cluster without repeating the same user input according to the technique described here. In addition there are shorthand expressions supported for entering ranges of values (e.g. IP address ranges in the form of 1.1.1.1-2.2.2.2) to expedite data entry in one embodiment. The data entered by the user is then used to create a new cluster and configure the first storage server at 503; e.g., the cluster is named according to the user input, the port designated by the user is used for the configuration module, the IP addresses and netmask designated by the user is used for the configuration module, etc. Once the cluster is created, the data can be used to fulfill requests from other storage servers that join the cluster via auto configuration. In one embodiment, after configuring the first storage server, other storage servers can join the cluster without repeating the same user input process as the first storage server. Once power is applied to the remaining storage servers they will proceed through the auto configuration process and join the existing cluster without any user intervention. Without the auto configuration process as described here, a user would be required to attach a console line to every storage server and manually enter each configuration parameter using a keyboard in certain systems.

Each storage server in the cluster is capable of responding to discovery requests from storage servers interested in joining the cluster. A thread runs in the broadcast response module 27 of every storage server 31 in the cluster, which listens for and responds to auto configuration broadcast packets. This thread ensures the correct allocation of auto configuration data and consistent responses to joining storage servers. Storage servers joining through auto configuration have their specific configuration parameters assigned by a storage server already in the cluster designated to provide this function. In one embodiment, there is no attempt by storage clusters to coordinate responses to broadcast requests and every cluster that receives a request can respond.

For a storage server to join a cluster instead of creating a new cluster, the configuration module of a storage server configures a network interface, e.g. by assigning an IP address and netmask at 504 and then polls the network for clusters to join. In one embodiment, the system is rebooted to run software that controls the cluster port. An auto configuration process is run in the configuration module 43 on a storage server 20 that wishes to join a cluster and sends broadcast discovery request UDP packets at 505, requesting responses from any cluster within the same broadcast domain as the storage server's cluster port. The UDP packet is used here as an example only and different protocol packets can be used for the broadcast. An example of a UDP packet is shown in FIG. 7. A response can contain the name of the cluster plus a unique cluster identifier as well as other components.

At 506, if the storage server receives no responses after a period of time, the auto configuration process retries the request for cluster names. In one implementation, the broadcast client repeats this until one of two things happens:

1. At 507, the auto configuration process run in the configuration module 43 decides that more than one response is received from multiple clusters. When this happens, the auto configuration process terminates and the user is prompted on the console 33 to select a cluster to join from the list of responses received at 509. Once the response is received, the storage server is configured and joined to the chosen storage cluster at 510. The process of configuration run in the configuration module 43 includes specifying the management interface configuration data (IP addresses, netmask, maximum transmission unit (MTU) size) and the DNS configuration data, initializing all of the disks attached to the storage server, assigning all of the disks attached to the storage server to the storage server, configuring the cluster port information (IP addresses, netmask, MTU size), joining the cluster, creating the root volume for the storage server, and initializing and starting all of the software components that rely on this configuration to function.

2. If only one response is received from a single cluster, the storage server continues the process of automatically configuring to join the cluster at 508. In one embodiment, this involves sending the packets requesting that the identified cluster allocate certain data (e.g. the management interface configuration data (IP addresses, netmask, maximum transmission unit (MTU) size), the DNS configuration data, the cluster port information (IP addresses, netmask, MTU size), etc.) for the storage server to join the cluster and respond appropriately. Once the response is received, the storage server continues the process of configuring itself using the information supplied by the cluster until configuration is complete and the storage server joins the cluster at 510. The process of configuration is as described above.

FIG. 6 is a flow diagram showing a process in storage server to join a new cluster being created. At 601, the configuration process of the storage server being installed prompts the user to input a range of network addresses for the configuration process to use. At 602, the configuration process prompts the user to input a range of network addresses to be used for a network storage cluster interface. At 603, the configuration process prompts the user to input a valid network storage cluster license key. At 604, the configuration process runs a DNS resolver (not shown in Figs.) to specify name servers that are used to route data packets from the network storage cluster and a client network. A name server (also called 'nameserver') is a program or computer server that implements a name-service protocol and maps (i.e. connects) a human-recognizable identifier of a host (e.g., the domain name) to its computer-recognizable identifier. At 605, the configuration process verifies configuration information entered by the user. At 606, the configuration process creates a network storage cluster and joins the storage server to the network storage cluster. At 607, another storage server joins the network storage cluster without requiring user input.

FIG. 7 illustrates an example of a UDP packet. UDP is a minimal message-oriented transport layer protocol that is currently documented in IETF RFC 768. The UDP header consists of four fields. The use of two of those is optional (source port and checksum).

The source port field 71 identifies the sending port. If not used, then it can be zero. The destination port field 72 is required and identifies the destination port. The length 73 can be a 16-bit field that specifies the length in bytes of the entire datagram: header and data. The minimum length is 8 bytes since that's the length of the header. The 16-bit checksum 74 field is used for error-checking of the header and data.

Figure 8:
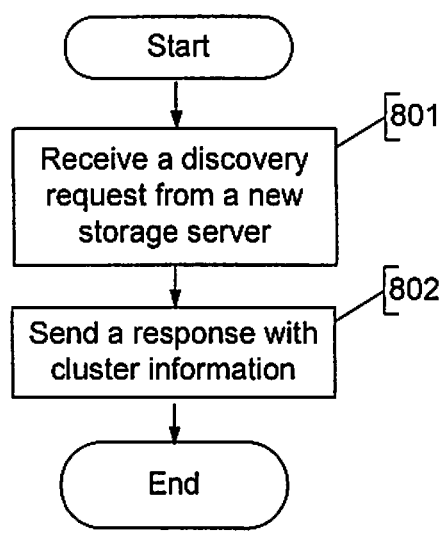
FIG. 8 is a flow diagram showing a process in a storage server already joined in a cluster for joining a new storage server to the cluster.

FIG. 8 is a flow diagram showing a process in a storage server already joined in a cluster for joining a new storage server to the cluster. When the storage server in a cluster receives a discovery request in a UDP broadcast packet from another storage server at 801, the storage server in the cluster (i.e. every storage server in the cluster) sends a response to the requesting storage server with the cluster information (e.g. cluster identification, IP address, netmask, etc.) at 802. If no configuration information exists for the joining storage server, the storage servers already in a cluster participate in a transaction to create and distribute the joining storage server's configuration information throughout the cluster. The storage server that is to be joined to a cluster consolidates responses from multiple clusters into a per-cluster list. Duplicate responses from a single cluster are combined into a single response.

Thus, a method and system for automatic configuration and installation of network storage server to a network storage cluster have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
inputting a range of network addresses for a management application of a network storage server;
broadcasting a discovery request in a UDP packet to a network storage cluster from the network storage server;
waiting to receive a response from the network storage cluster;
processing the discovery request by dynamically assigning attributes to the network storage server, wherein the attributes are used by the network storage server to join the network storage cluster; and
joining the network storage server to the network storage cluster without any user input being required to accomplish the joining, based on the response to the discovery request.

2. A method as recited in claim 1, wherein the attributes are saved persistently in the network storage server.

3. A method as recited in claim 1, further comprising generating the attributes by the management application without user input.

4. A method as recited in claim 3, wherein one attribute being generated without user input is a name of the network storage server.

5. A method as recited in claim 1, wherein the discovery request is sent via Ethernet.

6. A storage system comprising:
a processor;
a storage interface through which to access a persistent storage subsystem;
a network interface through which to communicate with a remote client;
a memory storing instructions which, when executed by the processor, cause the storage system to perform a process that comprises:
broadcasting a discovery request to a network storage cluster;
waiting to receive a response from the network storage cluster; and
joining the storage system to the network storage cluster without further user input, based on the response to the discovery request.

7. A system as recited in claim 6, wherein the process further comprises receiving a range of network addresses for a management application.

8. A system as recited in claim 6, wherein the process further comprises receiving attributes assigned by the network storage cluster, wherein the attributes are used by the storage system to join the network storage cluster.

9. A system as recited in claim 8, wherein the process further comprises generating the attributes by a management application of the storage system without user input.

10. A system as recited in claim 9, wherein one of the attributes generated without user input is a name of the storage system.

11. A system as recited in claim 6, wherein the discovery request is sent in UDP broadcast packets.

* * * * *